United States Patent [19]

Otomo et al.

[11] Patent Number: 4,731,683
[45] Date of Patent: Mar. 15, 1988

[54] MAGNETIC RECORDING AND REPRODUCING SYSTEM WITH COMPOSITE MAGNETIC HEAD

[75] Inventors: Shigekazu Otomo, Sayama; Noriyuki Kumasaka, Ome; Takeo Yamashita, Hachioji; Juichi Morikawa, Katsuta; Takayuki Kobayashi, Inaki; Mitsuhiro Kudo, Nishitama, all of Japan

[73] Assignee: Hitachi, Ltd., Tokyo, Japan

[21] Appl. No.: 724,688

[22] Filed: Apr. 19, 1985

[30] Foreign Application Priority Data

Apr. 20, 1984 [JP] Japan .................. 59-78587

[51] Int. Cl.⁴ .................. G11B 5/127; G11B 5/133
[52] U.S. Cl. .................. 360/119; 360/122; 360/125
[58] Field of Search .......... 360/119, 121, 122, 125, 360/127

[56] References Cited

U.S. PATENT DOCUMENTS

| | | | |
|---|---|---|---|
| 3,810,245 | 5/1974 | Ozawa et al. | 360/127 |
| 3,931,642 | 1/1976 | Kujimiya et al. | 360/122 X |
| 4,079,430 | 3/1978 | Fujishima et al. | 360/126 |
| 4,161,005 | 7/1979 | Kato et al. | 360/129 |
| 4,246,619 | 1/1981 | Hirai et al. | 360/125 |
| 4,439,794 | 3/1984 | Shiroshi et al. | 360/127 |
| 4,571,652 | 2/1986 | Fujiwara et al. | 360/122 |
| 4,590,530 | 5/1986 | Sakakima | 360/125 |
| 4,604,670 | 8/1986 | Visser | 360/125 X |

FOREIGN PATENT DOCUMENTS

| | | |
|---|---|---|
| 3244160 | 11/1982 | Fed. Rep. of Germany . |
| 56-159818 | 8/1981 | Japan . |
| 58-15513 | 1/1983 | Japan . |
| 58-91517 | 5/1983 | Japan . |

OTHER PUBLICATIONS

Patent Abstracts of Japan, vol. 6, No. 129, 7-15-82; (P-128), [1007]; and JP-A-57 53 814, (Tokyo Shibaura Denki K.K.).
Patent Abstracts of Japan, vol. 7, No. 2, (P-166), [1147], 1-7-1983; and JP-A-57 162 116 (Hitachi Seisakusho K.K.).

Primary Examiner—Stuart N. Hecker
Assistant Examiner—Alyssa H. Bowler
Attorney, Agent, or Firm—Antonelli, Terry and Wands

[57] ABSTRACT

The invention discloses a magnetic recording and reproducing system using a composite magnetic head whose surface facing a magnetic recording medium is composed primarily of a ferromagnetic metal and a high permeability ferrite single crystal, and which has a region close to a gap and composed of the ferromagnetic metal, wherein the composite magnetic head is arranged in such a fashion that the {110} plane of the high permeability ferrite single crystal is made to substantially coincide with a plane forming a principal magnetic circuit of the composite magnetic head, that the <100> direction lying inside the {110} plane is inclined at an angle of from 15° to 75° with respect to a direction perpendicular to the surface facing the magnetic recording medium, and that the magnetic recording medium travels in a direction which is relatively the same as, and parallel to, a vector formed by projecting a vector extending from the inside to the outside of the surface facing the magnetic recording medium in the <100> direction, on the surface facing the magnetic recording medium. This magnetic recording and reproducing system can remarkably reduce the step occurring on the surface facing the magnetic recording medium due to wear caused by the travel of the recording medium, and can reduce any output deterioration and fluctuation resulting from the step.

4 Claims, 7 Drawing Figures

MAGNETIC RECORDING AND REPRODUCING SYSTEM WITH COMPOSITE MAGNETIC HEAD

BACKGROUND OF THE INVENTION

This invention relates generally to a magnetic recording and reproducing system, and more particularly to a magnetic recording and reproducing system with a composite magnetic head comprising a combination of a ferromagnetic metal and a high permeability ferrite single crystal.

There is an extremely strong demand nowadays for an improved magnetic recording technique, particularly for magnetic recording of higher density.

It is well known in the art that to satisfy this demand, it is advantageous to increase the coercive force Hc of a magnetic recording medium. However, a magnetic field having a greater field intensity and a sharp distribution is necessary to record signals on a magnetic recording medium having high coercive force.

When ferrite material having a high permeability, which has been widely used in the past, is used for a magnetic head, its saturation flux density Bs is below 5,500 gauss so that there is an inevitable limitation to the intensity of the resulting recording magnetic field. Moreover recording is inadequate, particularly when a high coercive force magnetic tape, which has been recently developed, is used as the recording tape.

Materials having a great saturation flux density include heretofore known ferromagnetic metals such as Fe-Al-Si system alloys, Fe-Ni system alloys, Fe-Si system alloys, ferromagnetic amorphous alloys, and the like, but when these ferromagnetic metals are used alone for the magnetic head, the service life of the head is short because the surface facing the magnetic recording medium (hereinafter, sometimes, abbreviated as sliding surface) exhibits a high wear rate, and production of the head is difficult.

To eliminate the problems described above, a composite magnetic head has been proposed (e.g., Japanese Patent Laid-Open Nos. 159818/1981 and 155513/1983). This composite magnetic head has a construction in which the surface facing the magnetic recording medium is composed at least of a ferromagnetic metal and a high permeability ferrite, and the region near the gap is composed of a ferromagnetic metal having a high saturation flux density.

Since the region of the composite magnetic head near the gap is composed of a ferromagnetic metal having a high saturation flux density, the head exhibits excellent recording characteristics, and since at least a part of other regions of the surface facing the recording medium is composed of a high permeability ferrite having high wear resistance and high permeability at a high frequency, the head has high reproducing efficiency and high wear resistance.

However, if the surface facing the magnetic recording medium is composed of a high permeability ferrite having high wear resistance and a ferromagnetic metal having lower wear resistance than the former, the surface of the ferromagnetic metal is recessed more deeply than the surface of the high permeability ferrite due to wear caused by the travel of the magnetic recording medium in contact with said surfaces for an extended period of time; hence a step is formed between the two materials.

Because this step forms a small spacing between the magnetic recording medium and the ferromagnetic metal close to the gap, the output will deteriorate.

A recording wavelength tends to become shorter and the speed relative to the magnetic recording medium also tends to decrease due to the recent progress of high density magnetic recording. Therefore, the problem of the deterioration of the output due to the small spacing between, the head and the magnetic recording medium has become graver than the general wear of the head surface facing the magnetic recording medium.

When a composite magnetic head is employed, too, the problem of the small spacing resulting from the step described above is grave.

The following references are cited to show the state of art:

(1) Japanese Patent Laid-Open No. 159818/1981
(2) Japanese Patent Laid-Open No. 91517/1983
(3) Japanese Patent Laid-Open No. 155513/1983.

SUMMARY OF THE INVENTION

It is therefore the chief object of the present invention to provide a magnetic recording and reproducing system using a composite magnetic head which obviates the problems of the prior art described above, which exhibits less deterioration of the output even when used for a long time and which exhibits excellent wear resistance on the surface facing the magnetic recording medium.

To accomplish the object described above, the magnetic recording and reproducing system in accordance with the present invention uses a composite magnetic head whose surface facing a magnetic recording medium is composed at least of a ferromagnetic metal and a high permeability ferrite single crystal and whose portion close to a gap is composed of the ferromagnetic metal, whereby the magnetic head is disposed in such a manner that the {110} plane of the high permeability ferrite single crystal or its plane inclined from the {110} plane within a range such that the properties of the {110} plane are not lost coincides with a plane forming a principal magnetic circuit of the magnetic head, that the <100> direction lying inside the {110} plane is inclined within a range of from 15° to 75° with respect to a direction perpendicular to the surface facing the magnetic recording medium, and that the magnetic recording medium travels in contact with the surface facing the magnetic recording medium (hereinafter, abbreviated as travels) in a direction which is relatively the same as, and parallel to, the direction of a vector that is formed by projecting, onto the surface facing the magnetic recording medium, a vector that extends from the inside to the outside of the surface facing the magnetic recording medium in the <100> direction. In other words, the magnetic recording and reproducing apparatus of the present invention can be said to possess means for moving the magnetic recording medium in the direction described above.

The magnetic recording and reproducing apparatus of the present invention uses a single crystal for the high permeability ferrite constituting a part of the surface facing the magnetic recording medium, and is constructed in such a fashion that the crystal plane of the high permeability ferrite single crystal, which is easy to wear, becomes the surface of the composite magnetic head facing the magnetic recording medium, and the direction of travel of the magnetic recording medium is an agreement with the direction in which the ferrite single crystal is easy to wear.

According to the arrangement described above, the difference between the rate of wear of the ferromagnetic metal having a low rate of wear and that of the high permeability ferrite having a high rate of wear is reduced, the level difference at the step resulting from the travel of the magnetic recording medium decreases and the reduction of the output is prevented.

Even if the plane of the high permeability ferrite single crystal, which is easy to wear, is used as the surface facing the magnetic recording medium, its rate of wear is lower than that of the ferromagnetic metal, so that a magnetic head can be obtained which has longer service life than a magnetic head having a more made of ferromagnetic metal alone.

DETAILED DESCRIPTION OF THE INVENTION

Hereinafter, the present invention will be described in detail.

Among the planes of a high permeability ferrite single crystal, the planes having a high rate of wear are the {111} plane, the {211} plane and planes adjacent to these planes.

However, the inventors of this invention found that the rate of wear varied remarkably even on these planes having a high rate of wear, depending upon the direction of travel (Japanese Patent Laid-Open No. 91517/1983).

Figure 1A:
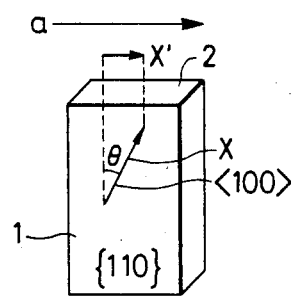
FIGS. 1a and 1b are perspective views of testpieces of high permeability ferrite single crystal for wear test.
Figure 1B:
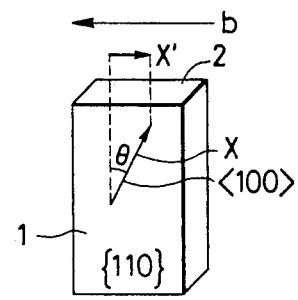

As shown in FIGS. 1a and 1b, for example, testpieces were produced so that {110} plane of an Mn-Zn ferrite single crystal was a side surface 1, and the <100> direction lying inside the {110} plane was inclined at an angle $\theta$ from a direction perpendicular to a sliding surface 2.

Figure 2:
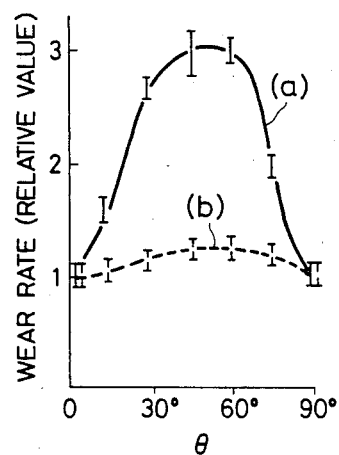
FIG. 2 is a diagram showing the direction dependence of a rate of wear of a high permeability ferrite single crystal.
Figure 4:
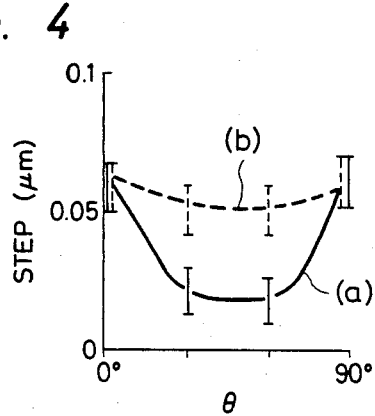
FIG. 4 is a diagram showing the relation between the level difference at the step on the surface, of the composite magnetic head shown in FIG. 3, facing the magnetic recording medium due to wear, and the crystal orientation of a core.
Figure 6:
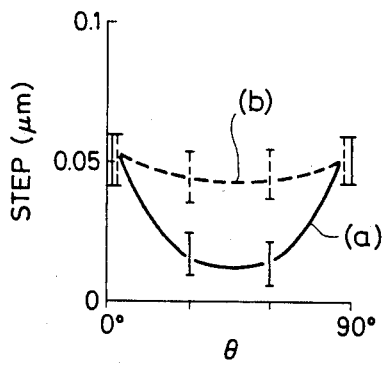
FIG. 6 is a diagram showing the relation between the level difference at the step on the surface, of the composite magnetic head shown in FIG. 5, facing the magnetic recording medium due to wear, and the crystal orientation of a core.

FIG. 2 illustrates the change of the wear rate of the ferrite single crystal with respect to the angle $\theta$. Curve (a) shows the case of FIG. 1a where the magnetic recording medium traveled on the sliding surface 2 in a direction which is parallel to, and relatively the same as, the direction of a vector X' obtained by projecting, onto the sliding surface 2, a vector X that extends from the inside to the outside of the sliding surface 2 in the <100> direction, and curve (b) shows the case of FIG. 1b where the magnetic recording medium traveled in a direction parallel to, but different from, the direction of the vector X'. Incidentally, FIG. 2 and later-appearing FIGS. 4 and 6 show the ranges of the actually measured values.

As can be seen from FIG. 2, when the travelling direction of the magnetic recording medium is relatively the same as that of the vector X' (curve (a)), the rate of wear increases with an increasing angle $\theta$, reaches the maximum at $\theta$ of from 35° to 55°, decreases with a further increasing $\theta$ value, and then reaches the minimum at 90°.

When $\theta = 35°$, the sliding surface 2 is the {211} plane, and when $\theta = 55°$, it corresponds to the {111} plane.

Therefore, the rate of wear can be said to be great on the {211} plane and the {111} plane.

As represented by curve (b), on the other hand, when the travelling direction of the magnetic recording medium is opposite the vector X', the rate of wear does not change much, even when $\theta$ changes, and its value remains small.

As described above, the rate of wear exhibits a remarkable difference depending on the travelling direction of the magnetic recording medium, even when the sliding surface is the same {211} or {111} plane.

As can be also seen from curve (a) in FIG. 2, the rate of wear is great at $\theta$ of from 15° to 75°, and is particularly great at $\theta$ of from 25° to 65°.

Therefore, the rate of wear of the high permeability ferrite single crystal can be increased and eventually, the formation of the step between the ferrite single crystal and the ferromagnetic metal having a high rate of wear can be prevented by inclining the <100> direction of the high permeability ferrite single crystal at an angle of 15° to 75°, preferably an angle of from 25° to 65°, with respect to a direction perpendicular to the sliding surface, and causing the magnetic recording medium to travel in a direction which is relatively the same as, and parallel to, the vector X' as shown in FIG. 1a.

To accomplish the composite magnetic head described above, a construction may be employed in which the {110} plane of the high permeability ferrite single crystal, or a plane obtained by inclining the {110} plane within a range in which its properties are not lost (within about 15°), is brought into agreement with a plane forming a principal magnetic circuit of the magnetic head, the <100> direction lying inside the {110} plane is inclined at an angle within the range of from 15° to 75°, preferably from 25° to 65°, with respect to a direction perpendicular to the surface facing the magnetic recording medium (this angle of inclination will be called "$\theta$"), and the magnetic recording medium travels in a direction which is relatively the same as, and parallel to, the vector (X') obtained by projecting onto the surface facing the magnetic recording medium, a vector (X) extending from the inside to the outside of the surface facing the magnetic recording medium in the <100> direction. As long as the right and left magnetic cores of the head satisfy the condition described above, the <100> directions of the right core and the left core may or may not be parallel each other, with the proviso that the <100> directions of the right and left magnetic cores are inclined on the same side with respect to the perpendicular direction described above.

The construction described above makes it possible to accomplish a magnetic recording and reproducing system having a composite magnetic head which has longer service life than a magnetic head made of a ferromagnetic metal alone, which also has excellent recording and reproducing characteristics for a high coercive force metal tape, which does not easily form a step on the surface facing a magnetic recording medium in the course of moving the magnetic recording medium across said surface for an extended period of time, and which exhibits less deterioration or change of the output.

Known magnetic head materials having a high saturation flux density typified by ferromagnetic crystalline alloys such as Fe-Al-Si system alloys, Fe-Si system alloys, Fe-Ni system alloys and ferromagnetic amorphous alloys such as those alloys which consist principally of at least one of Fe, Co, Ni, and the like, and to which at least one of the glass former elements, e.g., Si, B, C, Al, P, Ti, Zr, Hf, Y, Nb, Ta, V, Mo, W, Cr, and the like is added, can be used as the ferromagnetic metal to be used for the composite magnetic head of the magnetic recording and reproducing system of the present invention.

The ferromagnetic crystalline alloy is cut, ground or rolled in a thin sheet form from bulk, or is directly shaped into a thin sheet from the molten state by rapid quenching (such as the splat cooling method). The ferromagnetic amorphous alloy is directly shaped into thin sheet form from the molten state by rapid quenching described above. The composite magnetic head comprising the cores consisting essentially of the ferromagnetic metal and the high permeability ferrite single crystal can be produced using the thin sheet of either of the alloys.

The composite magnetic head can also be formed by depositing the ferromagnetic crystalline alloy or ferromagnetic amorphous alloy on the high permeability ferrite single crystal as the substrate by a film-forming technique such as spattering or vacuum evaporation.

As the wear rate of the ferromagnetic metal alone decreases and approaches the wear rate of the high permeability ferrite, it becomes more difficult for the step to be formed on the surface facing the magnetic recording medium. Therefore, the wear rate of the ferromagnetic metal is preferably as small as possible.

Generally, the ferromagnetic amorphous alloys have wear resistance superior to the ferromagnetic crystalline alloys. Among the ferromagnetic amorphous alloys, known metal-metal system amorphous alloys such as $Co_{85}Nb_{11}Hf_4$ (at %, hereinafter the same), $Co_{89}W_4Zr_7$, $Co_{80}Mo_{10}Zr_{10}$, $Co_{90}Zr_{10}$ and $Co_{84}Nb_{13}Zr_3$ containing metallic elements such as Zr, Hf, Y, Nb, Ta, and the like, as the glass former elements have wear resistance superior to metal-non-metal system amorphous alloys such as $(Fe_{0.06}Co_{0.94})_{75}Si_{11.5}B_{13.5}$ containing non-metallic elements such as Si, B, C, P and the like, as the glass former elements, and are therefore suitable as ferromagnetic metals to be used for the composite magnetic head of the present invention.

Mn-Zn ferrite single crystal can be generally used as the high permeability ferrite single crystal to be used in the present invention.

Ni-Zn ferrite single crystal can also be used in the present invention.

The structure of the composite magnetic head for the magnetic recording and reproducing system of the present invention other than the crystallographical problem may be arbitrary so long as at least the region of the head close to the gap is composed of ferromagnetic metal, the rest of the core is composed at least of high permeability ferrite single crystal, and the ferromagnetic metal and the high permeability ferrite single crystal are exposed at least on the surface facing the magnetic recording medium.

DESCRIPTION OF THE PRESENTLY PREFERRED EMBODIMENTS

Example 1

Figure 3:
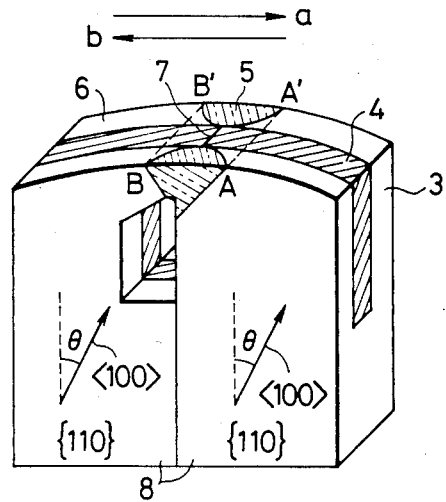
FIG. 3 is a perspective view of a composite magnetic head in accordance with one embodiment of the present invention.

FIG. 3 is a perspective view of the composite magnetic head used in this embodiment, and FIG. 4 is a diagram showing the relation between the step of the composite magnetic head shown in FIG. 3 and the angle $\theta$ described earlier.

The general structure of the composite magnetic head shown in FIG. 3 is essentially the same as that of the composite magnetic head disclosed in Japanese Patent Laid-Open No. 159818/1981 filed previously by the Applicant of this invention. Reference numeral 3 is a high permeability ferrite single crystal, 4 is the ferromagnetic metal, 5 is glass, 6 is the surface facing the magnetic recording medium, and 7 is the gap.

This embodiment uses Mn-Zn ferrite single crystal as the high permeability ferrite single crystal 3, and as the ferromagnetic metal 4, a 20 μm-thick Fe-Al-Si system thin alloy sheet having a composition of 85 wt % Fe, 9 wt % Si and 6 wt % Al, produced by a known splat cooling method.

As shown in the drawing, the composite magnetic head of this embodiment has its surface 6 facing the magnetic recording medium consisting of the high permeability ferrite single crystal 3, the ferromagnetic metal 4 and glass 5.

The region close to the gap 7 consists of the ferromagnetic metal 4 having a high saturation flux density. Therefore, the magnetic head has excellent recording characteristics, and has also excellent reproducing characteristics because the region around the ferromagnetic metal 4 consists of the high permeability ferrite single crystal 3 having high permeability at high frequency.

A plurality of composite magnetic heads were produced having a construction in which the plane 8 forming a principal magnetic circuit was substantially in agreement with the {110} plane of the high permeability ferrite single crystal, and the angle $\theta$ defined between the <100> direction lying in the {110} plane and the direction perpendicular to the surface facing the magnetic recording medium assumed various values.

FIG. 4 shows the change of the step between the ferromagnetic metal 4 and the high permeability ferrite single crystal 3 with respect to the angle $\theta$ when the magnetic recording medium travels for 500 hours in a direction (the direction a in FIG. 3) parallel to, and relatively the same as, the vector obtained by projecting on the surface facing the magnetic recording medium, a vector extending from the inside to the outside of the surface facing the magnetic recording medium in the <100> direction (curve (a)), and in a direction (the direction b in FIG. 3) in parallel with, but opposite to, the vector described above (curve (b)), the latter being for reference.

The position of measurement of the step was a position A - A' for the travelling direction a in FIG. 3 (this embodiment), and a position B -B' for the travelling direction b (for reference), and these positions were equidistant from the gap 7.

A metal powder tape having a high coercive force was used as the magnetic recording medium, and the relative speed of travel was 4 m/s.

As can be seen from FIG. 4, the step formed on the surface facing the magnetic recording medium can be remarkably reduced when the magnetic recording medium is run in the same direction (the direction a in FIG. 3) as the vector (curve a) in comparison with the case where the medium is run in the opposite direction (the direction b in FIG. 3) to the vector (in the referential example represented by curve b).

When a 5 MHz signal is recorded and reproduced by a magnetic head, recording-reproducing sensitivity decreases by about 4 dB when the step is 0.05 μm and by about 1.5 dB when the step is 0.02 μm, in comparison with the case where a magnetic head having no step is used.

Therefore, a magnetic recording and reproducing system, in which the output deterioration and the output fluctuation resulting from the travel of the magnetic recording medium are remarkably reduced than the prior art systems, can be accomplished.

As can also be seen from FIG. 4, the effect of the present invention is remarkable at $\theta$ in the range of from 25° to 65°, and can be sufficiently recognized at $\theta$ in the range of from 15° to 75°.

In the composite magnetic head of this embodiment, glass 5 is used, too, for a part of the sliding surface, and lead type glass having low hardness was used as this glass 5. The step between the glass region after travel of the magnetic recording medium and the ferromagnetic metal is zero, or the glass portion is recessed.

This embodiment uses, as the lead glass, glass having a composition consisting of 85 mol % PbO, 13 mol % $B_2O_3$, 1 mol % $SiO_2$ and 1 mol % $Al_2O_3$.

In the structure in which glass is used for the sliding surface such as described above, it is best to select a material having a wear rate at least equal to the wear rate of the ferromagnetic metal.

Example 2

Figure 5:
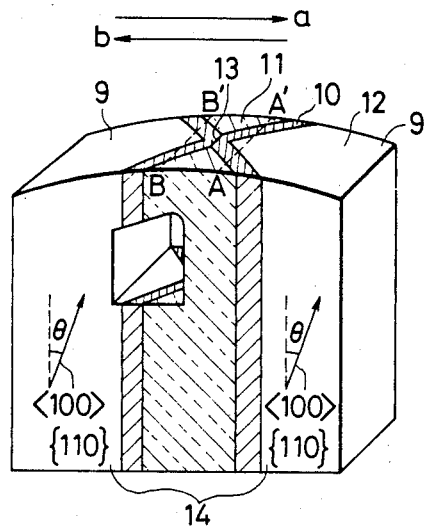
FIG. 5 is a perspective view of a composite magnetic head in accordance with another embodiment of the present invention.

FIG. 5 shows the composite magnetic head used for this embodiment, and FIG. 6 shows the relation between the step of the composite magnetic head shown in FIG. 5 and the angle $\theta$ mentioned above.

The general structure of the composite magnetic head used in this embodiment is essentially the same as one that is disclosed in Japanese Patent Laid-Open No. 155513/1983 filed previously by the Applicant of the present invention.

Reference numeral 9 represents the high permeability ferrite single crystal, 10 is the ferromagnetic metal, 11 is the glass, 12 is the surface facing the magnetic recording medium, 13 is the gap and 14 is the surface forming the principal magnetic circuit.

This embodiment used Mn-Zn ferrite single crystal as the high permeability ferrite single crystal 9, and used, as the ferromagnetic metal 10, an amorphous alloy spattered film having a composition of $Co_{84}Nb_{13}Zr_3$ (at %) which is formed by a high frequency spattering employing two electrodes on a substrate consisting of the Mn-Zn ferrite single crystal mentioned above.

In the composite magnetic head of this embodiment, too, the region near the gap 13 is composed of amorphous alloy spatter film having a high saturation flux density, and the rest of the magnetic core portions are composed of the Mn-Zn ferrite single crystal having a high frequency permeability. Therefore, the head has both excellent recording and reproducing characteristics.

In this embodiment, the composite magnetic heads were constituted in such a fashion that the surface 14 of the head forming the principal magnetic circuit substantially coincided with the {110} plane of the Mn-Zn ferrite single crystal, and the angle $\theta$ between the <100> direction lying in the {110} plane and the direction perpendicular to the surface 12 facing the magnetic recording medium assumed various values.

FIG. 6 shows the change of the step, between the ferromagnetic metal 10 on the surface 12 facing the magnetic recording medium and the high permeability ferrite single crystal 9 thereon, with respect to the angle $\theta$ when the magnetic recording medium travels for 500 hours in a direction (the direction a in FIG. 5) which is parallel to, and the same as, the vector formed by projecting a vector extending from the inside to the outside of the surface facing the magnetic recording medium in the <100> direction (curve a), and when the medium travels in the opposite direction (the direction b in FIG. 5), (curve b), the latter being for reference.

The position of measurement of the step was A-A' when the direction of travel of the medium is a in FIG. 5 (this embodiment) and B-B' when the direction of travel is b (referential example).

As can be seen from FIG. 6, the step becomes extremely small in this embodiment, too, when the direction of travel of the magnetic recording medium is parallel to, and relatively the same as, the vector, that is, the direction a, and its effective is particularly effective at the angle $\theta$ in the range of from 25° to 65°.

The effect is sufficiently recognized at the angle in the range of from 15° to 75°.

In this embodiment, too, the glass 11 is the same lead type glass as in Example 1, and the magnetic recording medium and the relative speed are also the same as those in Example 1. The relation between the level difference of the step and the recording and reproducing sensitivity is also as described in Example 1.

In Examples 1 and 2 given above, the {110} plane of the high permeability ferrite single crystal substantially coincides with the surface forming the principal magnetic circuit, but substantially the same effect can be obtained when the {110} plane is inclined within such a range where the property of the {110} plane is not lost.

For example, in a practical composite magnetic head, the surface forming the principal magnetic circuit is sometimes inclined at an angle of from about 5° to about 15° from the {110} plane to provide an azimuth angle, but if the angle of inclination is within such a range, the effect which is substantially the same as those of Examples 1 and 2 can be obtained.

Conventional teachings in the art may be employed for the magnetic recording and reproducing system of the present invention for those items which are not herein described.

As described above, the present invention provides the effect that a magnetic recording and reproducing system using a composite magnetic head employing a high permeability ferrite single crystal and a ferromagnetic metal can be obtained which can reduce the step on the surface facing a magnetic recording medium and can reduce the output fluctuation and output deterioration, by stipulating the direction of the high permeability ferrite single crystal and the travelling direction of the magnetic recording medium.

Obviously, many modifications and variations of the present invention are possible in the light of the teachings given above. It is therefore to be understood that within the scope of the appended claims, the invention may be practiced otherwise than as specifically described.

What is claimed is:

1. A magnetic recording and reproducing system with a composite magnetic head whose surface facing a magnetic recording medium is composed at least of a ferromagnetic metal and a high permeability ferrite single crystal, and at least whose region close to a gap is composed of said ferromagnetic metal, wherein said composite magnetic head is arranged in such a fashion that the {110} plane of said high permeability ferrite single crystal or a plane inclined from the {110} plane within such a range where the characteristics of the {110} plane are not lost is made to coincide with a plane forming a principal magnetic circuit of said composite head, that the <100> direction lying inside the {110} plane is inclined at an angle within the range of from 15° to 75° with respect to a direction perpendicular to the surface facing said magnetic recording medium, and that said magnetic recording medium travels in a direction which is relatively the same as, and parallel to, a vector formed by projecting a vector extending from the inside to the outside of said surface facing said magnetic recording medium in the <100> direction, on the surface said magnetic recording medium, whereby the difference between the rate of wear of said ferromagnetic metal and the rate of wear of said high permeability ferrite single crystal is reduced, thereby decreasing the level of a step resulting from the travel of said magnetic recording medium and preventing a reduction of output.

2. A magnetic recording and reproducing system according to claim 1 wherein the <100> direction is inclined at an angle within the range of from 25° to 65° with respect to a direction perpendicular to the surface facing said magnetic recording medium.

3. A magnetic recording and reproducing system according to claim 2 wherein said ferromagnetic metal of said composite magentic head is a ferromagnetic amorphous alloy.

4. A magnetic recording and reproducing system according to claim 1 wherein said ferromagnetic metal of said composite magnetic head is a ferromagnetic amorphous alloy.

* * * * *